3,756,938
CONDUCTOR ARRANGEMENT FOR COMPENSATING DETRIMENTAL MAGNETIC INFLUENCE ON A ROW OF POTS FROM ANOTHER IN PLANTS FOR PRODUCING METAL, FOR INSTANCE ALUMINUM, BY ELECTROLYTIC REDUCTION

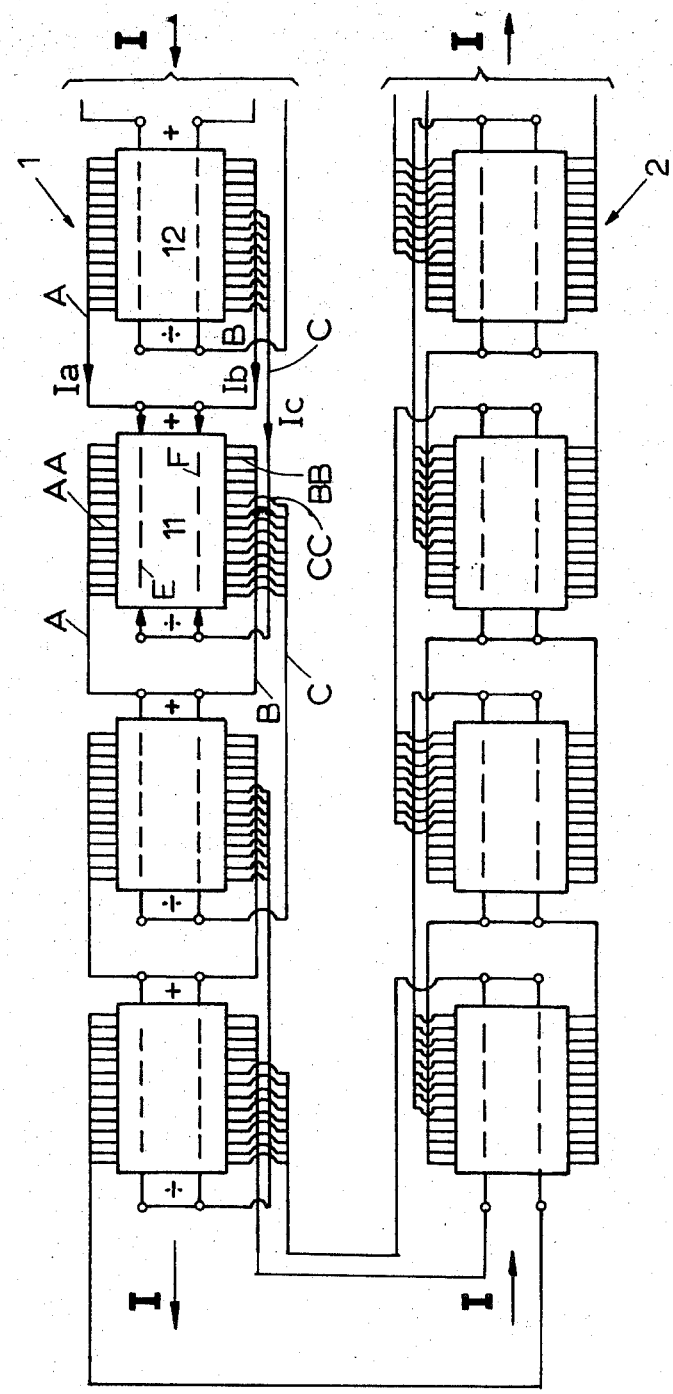

Hans Georg Tidemann Nebell, Ovre Ardal, Norway, assignor to A/S Ardal og Sunndal Verk, Oslo, Norway
Filed June 21, 1971, Ser. No. 154,925
Claims priority, application Norway, June 25, 1970, 2,476/70
Int. Cl. C22d 3/02, 3/12
U.S. Cl. 204—243 M                  3 Claims

ABSTRACT OF THE DISCLOSURE

Conductor arangement for compensating detrimental magnetic influence on a row of pots from another in plants for producing metal, for instance aluminum, by electrolytic reduction, in which the current supply to the anodes of each pot from the cathode in the preceding pot in the row, as far as the main proportion is concerned is conducted to the plus end of the pot while another and smaller proportion of the current supply is conducted to the minus end of the pot, characterized therein that the other proportion of the current supply is in its entirety located along that side of each pot in said one row facing the other pot row.

---

This invention relates to a conductor arrangement for compensating the detrimental magnetic influence on a row of cells or pots from another in plants for producing metal, for instance aluminum, by electrolytic reduction. In the smelting industry producing metal, such as aluminum, by electrolytic reduction, it is of essential importance to production economy that the large amounts of electrical energy used do not give rise to undue losses thereby reducing the production yield. It is further of great importance that the various parts of the plant and the associated equipment are well designed and dimensioned so as to render the big investments represented thereby as profitable as possible.

It is common practice in the aluminum smelting industry to arrange the electrolytic pots one after the other so that two or more rows of pots are formed. It is an advantage to arrange the pots in two or a larger even number of pot rows since separate conductors for returning the current are thereby avoided. The current direction in two adjacent rows will be of opposite sign .

A serious problem in such electrolytic reduction processes, which often employ currents of the order of 100,000 amperes, consists therein that the pot rows have often a considerable magnetic influence on each other, so that the molten metal forming the cathode in the bottom of each pot, is subjected to magnetic forces due to the currents flowing through the cathode. However, the distance between the pot rows is usually so large that adjacent rows in practice only have influence on the vertical field vector.

Because of its location and the curent direction an adjacent pot row will give rise to an undesired vertical field vector of for instance 20–30 gauss along the central axis of a pot having a current of about 150,000 amperes and with a centre to centre spacing between the row concerned and the adjacent row varying from about 9 to about 12 metre. In order to compensate for the above undesired or unbalanced field vector due to the adjacent row, there can be applied an oppositely directed and equally strong vertical magnetic field along the central axis of the pot. An earlier proposed method of obtaining this consists in the arrangement of an extra current conductor along the opposite side of the pot row to be compensated, with respect to that adjacent row the influence of which is to be eliminated. The extra current conductor is located in such distance from the pot row concerned and supplied with a separate current of such strength that a more or less complete balancing is obtained. This is, however, a very expensive way of solving the problems, primarily because auxiliary conductors are needed to carry the necessary current which is of considerable value, and secondly because the separate current used for this compensation will result in additional and undesired losses.

In British patent specifications 794,421 and 880,096 which relate to substantially the same problem as discussed above, there is described a solution which is essentially subject to discrepancies and disadvantages as just explained.

The present invention makes it possible to obtain full compensation without noticeable additional expenses of any kind, neither with respect to plant and equipment nor with respect to production and operation.

In similarity to the now conventional arrangements the present invention is in principle based on a largest possible degree of symmetrical structure of the current supply equipment in each pot row. This development towards completely symmetrical systems is mainly due to the requirement of keeping the various magnetic field vectors and current components under control. The invention in particular takes advantage of that modification of modern electrolytic reduction plants consisting therein that the current supply to the anodes of each pot from the cathode in the preceding pot in the row, as far as the main proportion is concerned, is conducted to the plus or upstream end of the pot, while another and smaller proportion of the current supply is conducted to the minus or downstream end of the pot. As well known to a person skilled in this art, this arrangement has been found to be advantageous in order to avoid undesired liquid flows in the longitudinal direction of the pot.

A substantial contribution to the desired magnetic field compensation is obtained according to the invention thereby that the other and smaller proportion of the current supply is in its entirety located along that side of each pot in one row facing the other pot row.

This solution thus is in contrast to the above discussed fundamental symmetry being aimed at in all conventional pot plants, in which the other and smaller proportion of the current supply being conducted to the downstream end of each pot, in similarity to the main proportion of the current, is conducted completely symmetrically with one half on each side of the pot row.

It will be realized that the unsymmetrical passage of the separate other portion of the current along each pot row will have a magnetic effect on the pot row being opposed to the magnetic influence of the other and adjacent row. On the basis of the proportion of current being conducted separately to the downstream end of each pot, it will usually not represent any difficult problem to a person skilled in the art to determine the size of and to position the necessary conductors for the above other portion of the current supply, by means of known calculation and measuring methods. Thus, for instance there is obtained a substantially complete compensation if one third of the total current is conducted along that side of the pot row facing the adjacent row, and the distance between the adjacent rows are three times the distance from the centre line of the pots to that bus bar or those conductors which provide for the other portion of the current supply to the downstream end of the pots. It is presumed in this example that the bus bar or conductors are lying in the same plane as the cathode metal pad in the pots.

The invention will be explained more closely in the following referring to the drawing which shows an example of a pot arrangement with a conductor arrangement according to the invention.

In the drawing there is shown an arrangement with two pot rows 1 and 2 in which one pot row 1 is passed by a current I which seen as a whole, flows from right to left in the drawing, while the other pot row is passed by the same current I in a direction from left to right in the drawing. For each pot in pot row 1 there is designated with plus signs and downstream signs what is the upstream and minus end, respectively, of the pot concerned, which is seen to be in accordance with the current direction indicated.

Among the pots shown in the drawing it has been chosen to consider pot 11 in pot row 1, and the current supply thereto from the preceding pot 12 in the same row. The main portion of the current from one pot to the succeeding pot is represented by the symmetrical currents Ia and Ib being conducted by respective bars or conductors A and B to the upstream end of the succeeding pot (pot 11 in the drawing), and delivered to longitudinal anode bus bars E and F which in a way known per se extend in the longitudinal direction of the pot above the anodes with connection to each of these. The overhead anode bus bars E and F are also extended beyond the downstream end of the pot where the same by means of separate bus bars or conductors C are supplied with another and smaller proportion Ic of the total current I. In contrast to the main bus bars A and B the bus bar or conductors C are in their entirety located unsymmetrically at one side of pot row 1, i.e. on that side of this row facing the other row or adjacent row 2.

Considering further in particular pot 11 it will be seen that the current outlet from the cathode takes place in a conventional way in lateral direction by means of a number of taps AA on one side connected to the bus bar A and a number of taps BB and CC on the other side of the pot connected to the bus bar B and the bus bar C, respectively. The other portion of the current being conducted to the downstream end of the succeeding pot is determined by which number of cathode taps CC of the total number of cathode taps that are connected to the bus bar C. The choice of this number is made with due consideration to factors and relationships being known from conventional techniques.

It will be obvious to a person skilled in the art that the drawing is illustrating only purely diagrammatically the substantial features of this invention, closer details of the pot arrangement and the current path not being shown. It will further be obvious that the way of showing the various conductors in the drawing does not give a correct and exact picture of the location of the corresponding bus bars and conductors in a practical plant, but only shows the principle aspect of the invention. The actual practical arrangement will be able to follow conventional design practice with due regard to the numerous factors and relationships being of importance in connection with such plants and the large currents as well as strong fields found there. Usually it is only the outermost pot rows which need compensation, provided that the pots are similar, the distances between the rows are equal and the current is the same. In this respect irregularities can be imagined, and then compensation will also be of interest in intermediate rows.

In addition to what appears from the above it shall finally be mentioned that the invention involves additional advantages in the form of a more stable operation and smaller risk of leakage of molten metal and electrolyte respectively from pots or cells in electrolytic reduction plants. Besides, reduced resistance variations during operation of the pots will be obtained and the possibilities of automatic control thereof are improved.

What is claimed is:

1. In an electrolytic pot line for producing metal by electrolytic reduction, said line having first and second parallel rows of pots, each of said pots having an anode and a cathode, said anode having an upstream end and a downstream end, said cathode having a plurality of taps on either side of said pot sequentailly positioned along the length of the pot from the upstream end to the downstream end, and means for providing electric current to the line for the operation of said pots; the improvement comprising a conductor arrangement for compensating the detrimental magnetic influence on one row of pots from the other row of pots, said arrangement comprising first conductor means for conducting the main proportion of current fom the cathode of each pot to the upstream end of the anode of the next downstream pot and second conductor means for conducting a smaller proportion of current from the cathode of each pot to the downstream end of the anode of the next downstream pot, said second conductor means lying entirely along the side of said one row of pots facing said row of pots.

2. The improvement of claim 1 wherein said first conductor means is substantially symmetrically arranged about either side of each pot.

3. The improvement of claim 2 wherein said second conductor means is connected to the downstream cathode taps of said pots on the side of said pots facing the other row.

References Cited
UNITED STATES PATENTS

| | | | |
|---|---|---|---|
| 3,616,317 | 10/1971 | McLellan et al. | 204—243 M |
| 3,616,318 | 10/1971 | Johnson | 204—243 M |
| 3,617,454 | 11/1971 | Johnson | 204—243 M |

JOHN H. MACK, Primary Examiner

D. R. VALENTINE, Assistant Examiner

U.S. Cl. X.R.

204—244